(12) United States Patent
Kim et al.

(10) Patent No.: US 8,941,721 B2
(45) Date of Patent: Jan. 27, 2015

(54) MOBILE TERMINAL AND METHOD FOR CONTROLLING OPERATION OF THE MOBILE TERMINAL

(75) Inventors: Kilseon Kim, Seoul (KR); Hakhae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 537 days.

(21) Appl. No.: 13/194,763

(22) Filed: Jul. 29, 2011

(65) Prior Publication Data

US 2012/0038747 A1 Feb. 16, 2012

(30) Foreign Application Priority Data

Aug. 16, 2010 (KR) ........................ 10-2010-0078923

(51) Int. Cl.
*H04N 13/02* (2006.01)
*H04N 1/00* (2006.01)
*H04N 5/262* (2006.01)

(52) U.S. Cl.
CPC ....... *H04N 13/0239* (2013.01); *H04N 1/00161* (2013.01); *H04N 5/2628* (2013.01); *H04N 1/00307* (2013.01); *H04N 1/00347* (2013.01)
USPC ....... 348/46; 348/51; 348/207.11; 348/208.6; 348/240.99; 348/240.2

(58) Field of Classification Search
CPC ..... H04N 5/2251; H04N 5/247; H04N 5/262; H04N 5/2628
See application file for complete search history.

(56) References Cited

U.S. PATENT DOCUMENTS

| | | | |
|---|---|---|---|
| 4,818,858 A * | 4/1989 | Sorimachi et al. | 250/203.2 |
| 5,603,687 A * | 2/1997 | Hori et al. | 600/166 |
| 7,108,657 B2 * | 9/2006 | Irion et al. | 600/110 |
| 7,193,626 B2 * | 3/2007 | Otani et al. | 345/418 |
| 7,233,352 B2 * | 6/2007 | Matherson et al. | 348/251 |
| 7,505,062 B2 * | 3/2009 | Davidson et al. | 348/77 |
| 7,564,626 B2 * | 7/2009 | Bendall et al. | 359/462 |
| 7,936,384 B2 * | 5/2011 | Sawachi | 348/240.1 |
| 8,022,980 B2 * | 9/2011 | Davidson | 348/77 |
| 8,031,909 B2 * | 10/2011 | Se et al. | 382/106 |
| 8,085,293 B2 * | 12/2011 | Brodsky et al. | 348/49 |
| 8,233,660 B2 * | 7/2012 | Fritsch et al. | 382/103 |
| 8,509,519 B2 * | 8/2013 | Wang | 382/154 |

(Continued)

FOREIGN PATENT DOCUMENTS

EP 2296072 A3 * 6/2011

OTHER PUBLICATIONS

Yamaguchi et al. "Bio-Inspired Functional Asymmetry Camera System" Neural Information Processing. Lecture Notes in Computer Science vol. 4985, 2008, pp. 637-646.*

(Continued)

*Primary Examiner* — Sath V Perungavoor
*Assistant Examiner* — Matthew J Anderson
(74) *Attorney, Agent, or Firm* — Birch, Stewart. Kolasch & Birch, LLP (57) ABSTRACT

A mobile terminal and a method for controlling the operation of the same are provided. The mobile terminal includes a first camera including a first lens, a second camera including a second lens having a wider angle than the first lens, and a controller configured to generate a stereoscopic 3D image using disparity between images captured through the first and second cameras. It is possible to generate a stereoscopic 3D image having the same resolution as that of a 2D image that can be captured.

10 Claims, 10 Drawing Sheets

(56) References Cited

U.S. PATENT DOCUMENTS

| | | | |
|---|---|---|---|
| 2002/0141635 A1* | 10/2002 | Swift et al. | 382/154 |
| 2003/0117675 A1* | 6/2003 | Shirato et al. | 358/505 |
| 2007/0035619 A1* | 2/2007 | Yoon | 348/47 |
| 2008/0252719 A1* | 10/2008 | Choi et al. | 348/43 |
| 2009/0122154 A1* | 5/2009 | Lee | 348/222.1 |
| 2009/0315915 A1* | 12/2009 | Dunn et al. | 345/632 |
| 2011/0045812 A1* | 2/2011 | Kim et al. | 455/418 |
| 2011/0046784 A1* | 2/2011 | Anderson | 700/259 |
| 2012/0019624 A1* | 1/2012 | Park et al. | 348/47 |

OTHER PUBLICATIONS

Saxena et al. "Learning 3-D Scene Structure from a Single Still Image" IEEE Transactions on Pattern Analysis and Machine Intelligence. vol. 31 Issue 5, (May 2009) pp. 824-840.*

* cited by examiner

MOBILE TERMINAL AND METHOD FOR CONTROLLING OPERATION OF THE MOBILE TERMINAL

CROSS-REFERENCE TO RELATED APPLICATION

This application claims the priority benefit of Korean Patent Application No. 10-2010-0078923, filed on Aug. 16, 2010 in the Korean Intellectual Property Office, the disclosure of which is incorporated herein by reference

BACKGROUND OF THE INVENTION

1. Field of the Invention

The present invention relates to a mobile terminal and a method for controlling the operation of the same, and more particularly to a mobile terminal, that provides a 3D capture mode for generating stereoscopic 3D images, and a method for controlling the operation of the same.

2. Description of the Related Art

Mobile terminals are portable devices that can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made in terms of hardware or software to provide more complex functionality to the mobile terminal implemented as such a multimedia player. One example is a user interface environment that enables the user to easily and conveniently search for and select a function.

A technology in which a number of images captured through cameras are combined through image processing to generate a stereoscopic 3D image has also been used recently. When this technology is applied to a mobile terminal, it is possible to generate a stereoscopic 3D image using cameras provided on the mobile terminal.

When the mobile terminal provides a 3D capture mode for generating stereoscopic 3D images, a stereoscopic 3D image is generally generated using images that are simultaneously captured using two cameras in the 3D capture mode. Because the stereoscopic 3D image is generated for a region that can be captured by both of the two cameras, resolution of the stereoscopic 3D image is reduced compared to resolution of a 2D image captured using one camera. Thus, to generate a stereoscopic 3D image having the same resolution as that of conventional 2D images, it is necessary to use image sensors having a larger number of pixels (i.e., high resolution) for the two cameras.

SUMMARY OF THE INVENTION

The present invention provides a mobile terminal and a method for controlling the operation of the mobile terminal, wherein it is possible to capture a stereoscopic 3D image having the same resolution as that of a 2D image that can be captured.

According to an aspect of the present invention, there is provided a mobile terminal including a first camera including a first lens, a second camera including a second lens having a wider angle than the first lens, and a controller configured to generate a stereoscopic 3D image using disparity between images captured through the first and second cameras.

According to another aspect of the present invention, there is provided a mobile terminal including a first camera including an image sensor having a first number of pixels and a first lens, a second camera including an image sensor having a second number of pixels, larger in number than the first number of pixels, and a second lens having a wider angle than the first lens, and a controller configured to generate a stereoscopic 3D image using disparity between images captured through the first and second cameras.

According to another aspect of the present invention, there is provided a method for controlling operation of a mobile terminal, the method including providing a first camera including a first lens and a second camera including a second lens having a wider angle than the first lens, capturing images through the first and second cameras, and generating a stereoscopic 3D image using disparity between the images captured through the first and second cameras.

According to another aspect of the present invention, there is provided a method for controlling operation of a mobile terminal, the method including providing a first camera including an image sensor having a first number of pixels and a first lens and a second camera including an image sensor having a second number of pixels, larger in number than the first number of pixels, and a second lens having a wider angle than the first lens, capturing images through the first and second cameras, and generating a stereoscopic 3D image using disparity between the images captured through the first and second cameras.

According to another aspect of the present invention, there is provided a method for controlling operation of a mobile terminal, the method including providing a first camera including a first lens and a second camera including a second lens having a wider angle than the first lens, providing a 3D zoom function using disparity between preview images obtained through the first and second cameras, and providing a zoom function using a preview image obtained through the second camera upon selection of a wide zoom function.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

In the following detailed description, reference is made to the accompanying drawing figures that form a part hereof, and that show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The term 'mobile terminal', as used herein, may indicate a mobile phone, a smart phone, a laptop computer, a digital broadcast receiver, a personal digital assistant (PDA), a portable multimedia player (PMP), a navigation device, a tablet computer, an electronic-book (e-book) reader, and the like. In this disclosure, the terms 'module' and 'unit' can be used interchangeably.

Figure 1:
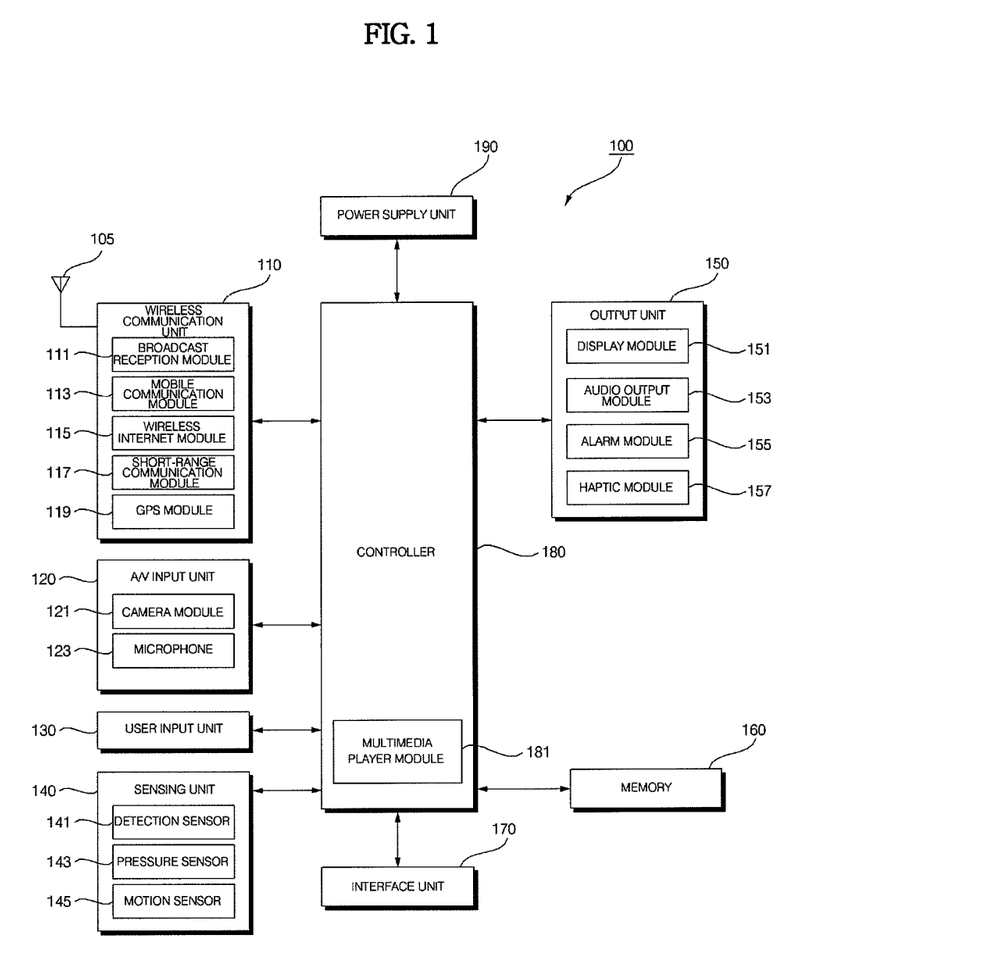
FIG. 1 illustrates a block diagram of a mobile terminal according to an embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Here, when the above constituent elements are implemented, two or more of the constituent elements may be combined into one constituent element, or one constituent element may be divided into two or more constituent elements, if appropriate.

The wireless communication unit 110 may include a broadcast reception module 111, a mobile communication module 113, a wireless internet module 115, a short-range communication module 117, and a global positioning system (GPS) module 119.

The broadcast reception module 111 may receive broadcast signals and/or broadcast-related information from an external broadcast management server through a broadcast channel. The broadcast channel may be a satellite channel or a terrestrial channel. The broadcast management server may be a server that generates broadcast signals and/or broadcast-related information and transmits the generated broadcast signals and/or the generated broadcast-related information or may be a server that receives and then transmits previously-generated broadcast signals and/or previously-generated broadcast-related information.

The broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may come in the form of digital multimedia broadcasting (DMB) electronic program guide (EPG) or digital video broadcasting-handheld (DVB-H) electronic service guide (FSG).

The broadcast reception module 111 may receive broadcast signals using various broadcasting systems, such as DMB-terrestrial (DMB-T), DMB-satellite (DMB-S), media forward link only (MediaFLO), DVB-H, and integrated services digital broadcast-terrestrial (ISDB-T). In addition, the broadcast reception module 111 may be suitable not only for the above-mentioned digital broadcasting systems but also for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless interne module 115 may be a module for wirelessly accessing the internet. The wireless internet module 115 may be embedded in the mobile terminal 100 or may be installed in an external device. The wireless interne module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera module 121 and a microphone 123. The camera module 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external audio signals during a call mode, a recording mode, or a voice recognition mode and may convert the received sound signals into electrical audio data. During the call mode, the mobile communication module 113 may convert the electrical sound data into data that can be readily transmitted to a mobile communication base station, and may then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, or a static pressure or capacitive touch pad that is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 may determine a current state of the mobile terminal 100 such as whether the mobile terminal 100 is opened or closed, the position of the mobile terminal 100 and whether the mobile terminal 100 is placed in contact with the user, and may generate a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143 and a motion sensor 145. The detection sensor 141 may detect an approaching object or whether there is an object nearby the mobile terminal 100 without mechanical contact. More specifically, the detection sensor 141 may detect an approaching object based on a change in an alternating current (AC) magnetic field or a static magnetic field, or the rate of change of capacitance. The sensing unit 140 may include two or more detection sensors 141.

The pressure sensor 143 may determine whether pressure is being applied to the mobile terminal 100 or may measure the magnitude of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, that is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

The motion sensor 145 may determine the location and motion of the mobile terminal 100 using an acceleration sensor or a gyro sensor.

Generally, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, two or more acceleration sensors representing different axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device capable of receiving information by being touched by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of an LCD, a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving an incoming call or message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesis. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a list of contacts, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, that performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, that plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. Various embodiments presented herein can be implemented using nearly any type of mobile terminal, such as a folder-type, a bar-type, a swing-type and a slider-type mobile terminal. However, for convenience, it is assumed that the mobile terminal 100 is a bar-type mobile terminal equipped with a touch screen.

Figure 2:
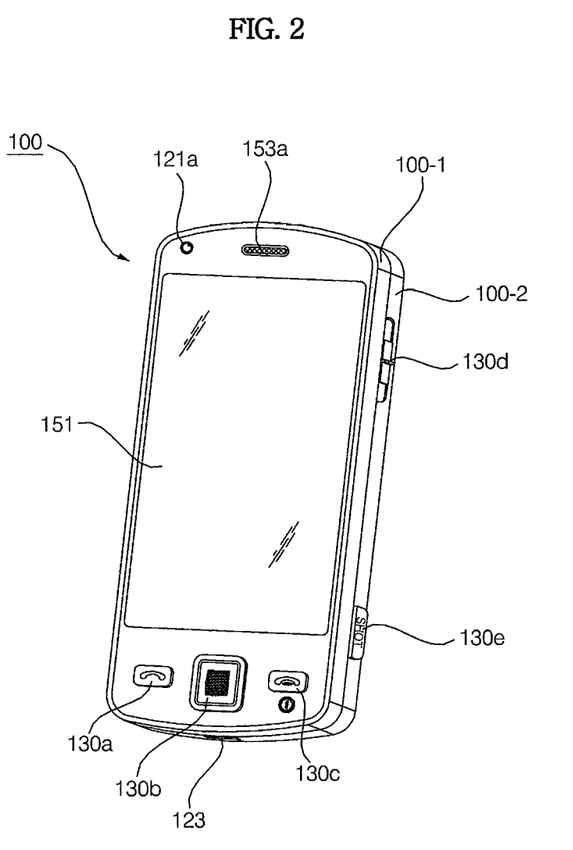
FIG. 2 illustrates a front perspective view of the mobile terminal shown in FIG. 1.

FIG. 2 illustrates a front perspective view of the mobile terminal 100. Referring to FIG. 2, the exterior of the mobile terminal 100 may be formed by a front case 100-1 and a rear case 100-2. Various electronic devices may be installed in the space formed by the front case 100-1 and the rear case 100-2. The front case 100-1 and the rear case 100-2 may be formed of a synthetic resin through injection molding. Alternatively, the front case 100-1 and the rear case 100-2 may be formed of a metal such as stainless steel (STS) or titanium (Ti).

The display module 151, a first audio output module 153*a*, a first camera 121*a*, and first through third user input modules 130*a* through 130*c* may be disposed in the main body of the mobile terminal 100, and particularly, in the front case 100-1. Fourth and fifth user input modules 130*d* and 130*e* and the microphone 123 may be disposed on one side of the rear case 100-2.

If a touch pad is configured to overlap the display module 151 and thus to form a mutual layer structure, the display module 151 may serve as a touch screen. Thus, the user can enter various information simply by touching the display module 151.

The first audio output module 153*a* may be implemented as a receiver or a speaker. The first camera 121*a* may be configured to be suitable for capturing a still or moving image of the user. The microphone 123 may be configured to properly receive the user's voice or other sounds.

The first through fifth user input modules 130*a* through 130*e* and sixth and seventh user input modules 130*f* and 130*g* (FIG. 3) may be collectively referred to as the user input unit 130. The user input unit 130 may adopt various tactile manners as long as it can offer tactile feedback to the user.

For example, the user input unit 130 may be implemented as a dome switch or touch pad capable of receiving a command or information by being pushed or touched by the user; or a wheel, a jog dial or wheel, or a joystick capable of receiving a command or information by being rotated. More specifically, the first through third user input modules 130*a* through 130*c* may be used to make or receive a call, move a mouse pointer, scroll a display screen, and enter various commands such as 'start', 'end', and 'scroll' to the mobile terminal 100, the fourth user input module 130*d* may be used to select an operating mode for the mobile terminal 100, and the fifth user input module 130*e* may serve as a hot key for activating certain functions of the mobile terminal 100.

The first user input module 130*a* may allow the user to, the second user input module 130*b* may be used to enter various numerals, characters or symbols, and the third and fourth user input modules 130*c* and 130*d* may be used as hot keys for activating certain functions of the mobile terminal 100.

Figure 3:
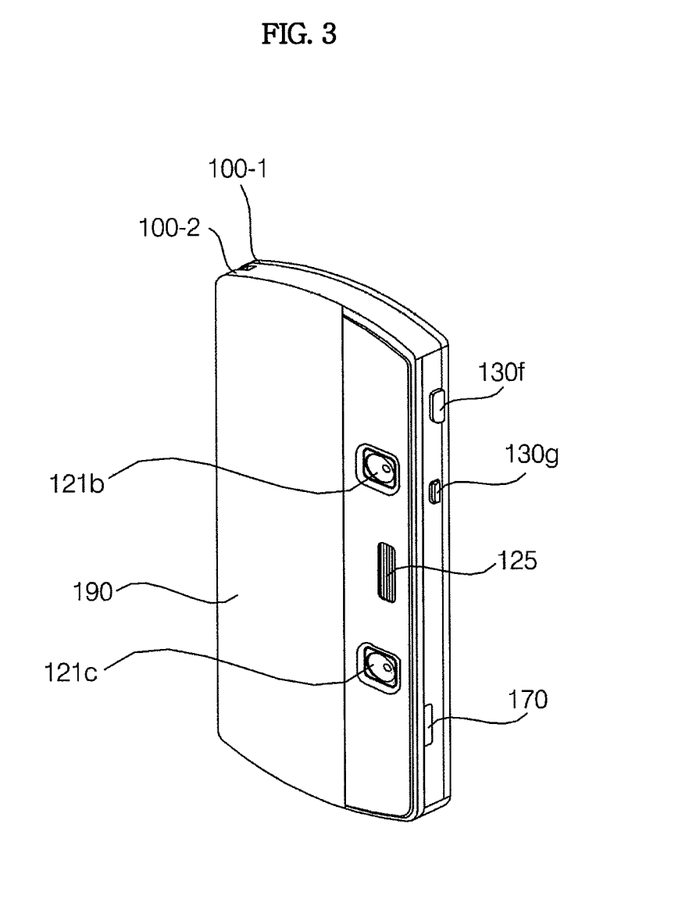
FIG. 3 illustrates a rear perspective view of the mobile terminal shown in FIG. 2.

FIG. 3 illustrates a rear perspective view of the mobile terminal 100. Referring to FIG. 3, two cameras 121*b* and 121*c* may be disposed at the rear of the rear case 100-2. The sixth and seventh user input modules 130f and 130g and the interface unit 170 may be disposed on one side of the second body 100B.

Each of the two cameras 121b and 121c disposed at the rear side of the mobile terminal 100 may have a capture direction substantially opposite to that of the camera 121a disposed at the front side and may have a different resolution (i.e., a different number of pixels) from that of the camera 121a. The two cameras 121b and 121c disposed at the rear side may be simultaneously used to generate a stereoscopic 3D image in a 3D capture mode for capturing stereoscopic 3D images and may also be independently used to generate a 2D image.

The two cameras 121b and 121c may be arranged at the rear side such that it is possible to adjust the interval between the two cameras 121b and 121c to adjust the size, resolution, or the like of a stereoscopic 3D image that can be generated through the two cameras 121b and 121c. One of the two cameras 121b and 121c may be movable in a horizontal direction so as to adjust the interval between the two cameras 121b and 121c. In addition, one of the two cameras 121b and 121c may be detachably mounted to the mobile terminal 100 such that the camera can be mounted to the mobile terminal 100 only when needed.

A flash 125 and a mirror may be additionally provided at the rear side between the two cameras 121b and 121c. The flash 125 shines light toward a subject when the subject is captured using the two cameras 121b and 121c. The mirror allows the user to view their face or the like when capturing an image of themselves.

A second audio output module may be additionally provided on the rear case 100-2. The second audio output module may implement a stereo function in conjunction with the first audio output module 153a and may be used to perform voice or video communication in a speakerphone mode.

The interface unit 170 may serve as a passage for exchanging data with an external device. An antenna for receiving broadcast signals in addition to an antenna for communication may be provided on the front case 100-1 and the rear case 100-2 at portions thereof. Each antenna may be mounted to be retractable from the rear case 100-2.

A power supply unit 190 for supplying power to the mobile terminal 100 may be provided on the rear case 100-2. The power supply unit 190 is, for example, a rechargeable battery that is detachably mounted to the rear case 100-2 for the purpose of recharging or the like.

Figure 4:
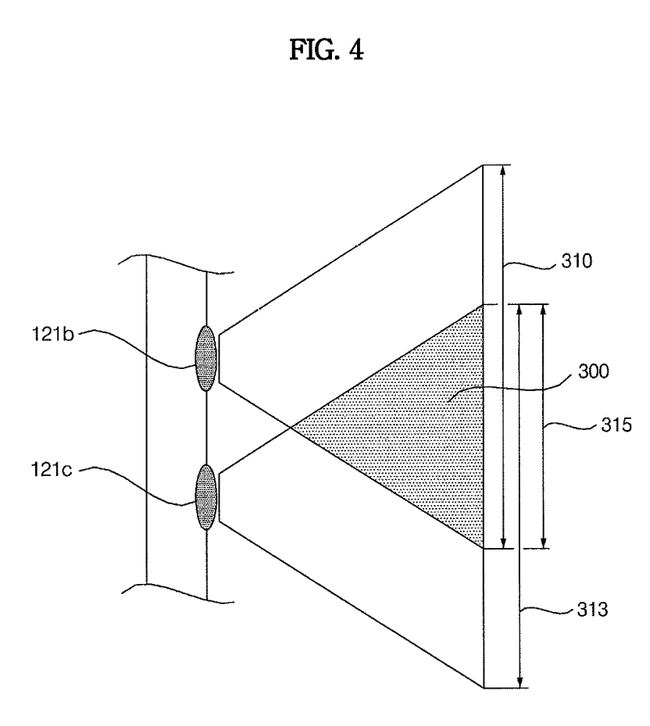
FIGS. 4 to 6 illustrate a configuration of a mobile terminal according to an embodiment of the present invention.
Figure 5:
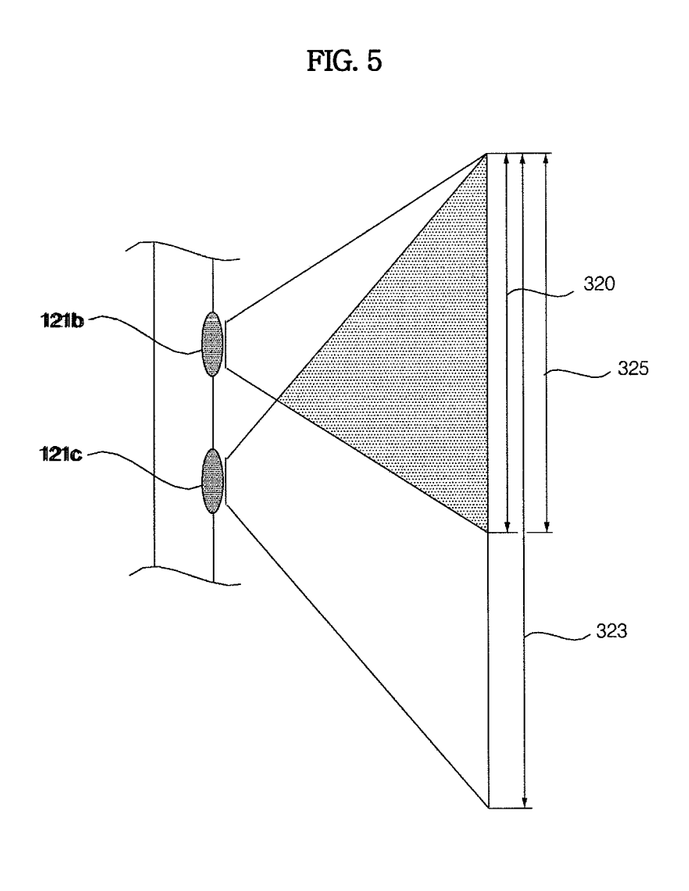
Figure 6:
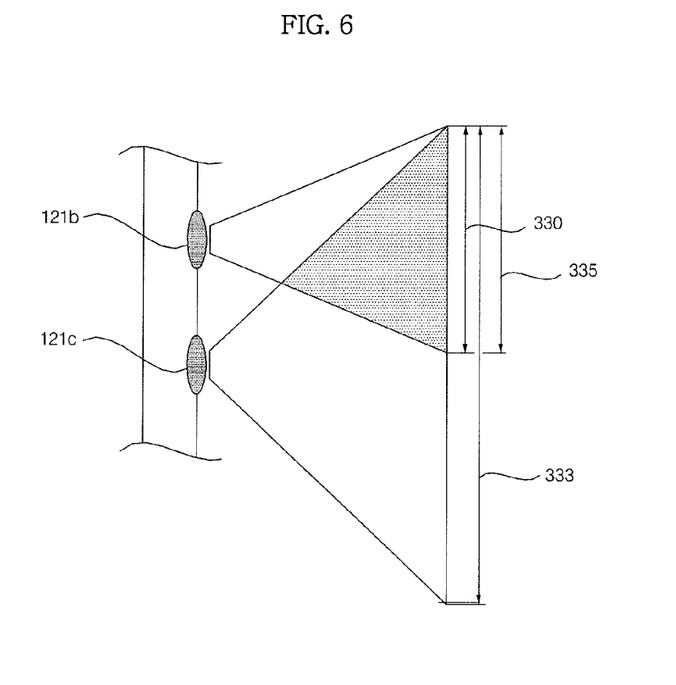

FIGS. 4 to 6 illustrate a configuration of a mobile terminal according to an embodiment of the present invention. The mobile terminal 100 according to the present invention can generate a stereoscopic 3D image using the two cameras 121b and 121c provided at the rear side of the main body of the mobile terminal 100. For ease of explanation, the two cameras 121b and 121c are hereinafter referred to as a first camera 121b and a second camera 121c.

As shown in FIG. 4, when a subject is captured using the first and second cameras 121b and 121c, the first and second cameras 121b and 121c produce two images, respectively. The controller 180 generates a stereoscopic 3D image using a disparity between the two images.

The term "3D stereoscopic image" refers to an image that is perceived by the user when displayed on a monitor or screen such that each object present in the image appears to have the same depth and realism as any normal object in real space. A stereoscopic 3D image provides different 2D images to each eye. The two 2D images are then transmitted to the brain via the retina. The brain then combines the two images so as to give depth and realism. Stereoscopic sensation is produced by binocular disparity due to the distance of about 65 mm between human eyes. Binocular disparity is used for all stereoscopic displays to produce 3D imaginary.

The stereoscopic 3D image generated by the controller 180 may be displayed on the display module 151. A 3D photograph may also be printed using dedicated photographic paper and equipment. A stereoscopic 3D image may be generated in the same manner as described above when moving image capture is performed as well as when still image capture is performed.

Methods for displaying a stereoscopic 3D image include a stereoscopic method utilizing glasses, an auto-stereoscopic method that does not require the use of glasses, and a projection method utilizing holographic technology. The stereoscopic method is widely used for household TVs and auto-stereoscopy is generally used for mobile terminals.

Methods that do not require the use of glasses include a lenticular method, a parallax barrier method, and a parallax illumination method. In the lenticular method, a semi-cylindrical lenticular sheet corresponding to the interval between left-eye and right-eye images is attached to the front of an element on which the left-eye and right-eye images are displayed such that the left-eye image is viewed only by the left eye and the right-eye image is viewed only by the right eye, thereby providing a stereoscopic sensation. In the parallax barrier method, left-eye and right-eye images are displayed below a parallax barrier such that different images are viewed by the left and right eyes, thereby providing a stereoscopic sensation. In the parallax illumination method, an illumination line is provided at the rear side of an LCD configured such that different LCD lines of illuminated light are provided to the left and right eyes, thereby providing a stereoscopic effect. In addition, studies have been conducted on methods for implementing 3D display based on other factors providing stereoscopic perception to human.

However, because a stereoscopic 3D image can be generated from an overlapping region 300 of the capture ranges of the first and second cameras 121b and 121c, the resolution 315 of a stereoscopic 3D image generated using the first and second cameras 121b and 121c is less than the capture resolution 310 of the first camera 121b or the capture resolution 313 of the second camera 121c.

To obtain a stereoscopic 3D image having the same resolution as the capture resolution 310 of the first camera 121b or the capture resolution 313 of the second camera 121c, each of the first and second cameras 121b and 121c may use an image sensor having a larger number of pixels and a wide angle lens.

However, in the mobile terminal 100 according to an embodiment of the present invention, only one of the first and second cameras 121b and 121c uses an image sensor having a larger number of pixels and a wide angle lens to generate a stereoscopic 3D image having the same resolution as that of a 2D image.

FIG. 5 illustrates the case where only the second camera 121c among the first and second cameras 121b and 121c uses an image sensor having a larger number of pixels and a wide angle lens. For example, the first camera 121b uses a 3M pixel image sensor and the second camera 121c uses a 5M pixel image sensor and a wide angle lens.

In this case, a stereoscopic 3D image can be generated for a region 300 in which the capture range 320 of the first camera 121b and the capture range 323 of the second camera 121c overlap. As a result, the capture resolution 325 of a stereoscopic 3D image generated using the first and second cameras 121b and 121c is substantially the same as the capture resolution 320 of a 2D image that can be captured using the first camera 121b.

Thus, there is an advantage in terms of cost over the case where one of the first and second cameras 121b and 121c use an image sensor having a larger number of pixels and a wide angle lens to generate a stereoscopic 3D image having the same resolution as that of a 2D image. In addition, the first and second cameras 121b and 121c may be independently activated to simultaneously capture two images with different capture settings such as lens focal distance, color, sensitivity, etc.

FIG. 6 illustrates the case where only the second camera 121c among the first and second cameras 121b and 121c uses a wide angle lens. It is also possible to generate a stereoscopic 3D image having the same resolution as that of a 2D image when the first and second cameras 121b and 121c use image sensors having the same number of pixels while the optical characteristics of only the second camera 121c have been changed as shown in FIG. 6.

That is, a stereoscopic 3D image can be generated for a region 300 in which the capture range 330 of the first camera 121b and the capture range 333 of the second camera 121c overlap. As a result, the capture resolution 335 of a stereoscopic 3D image generated using the first and second cameras 121b and 121c is substantially the same as the capture resolution 320 of a 2D image that can be captured using the first camera 121b.

However, when the mobile terminal 100 uses the first and second cameras 121b and 121c including image sensors having the same number of pixels, a region, that can be used to generate a stereoscopic 3D image, of an image captured through the second camera 121c using the wide angle lens may be reduced compared to a region, that can be used to generate a stereoscopic 3D image, of an image captured through the first camera 121b. Accordingly, it is possible to perform a process for scaling up the image captured using the second camera 121c such that the image reaches the same size as the image captured using the first camera 121b to generate a stereoscopic 3D image. This may slightly degrade image quality.

As described above, it is possible to generate a stereoscopic 3D image having the same resolution as that of a 2D image, that can be captured, by using the first and second cameras 121b and 121c having the same resolution while using a wide angle lens only for the second camera 121c. Use of the wide angle lens also achieves an additional advantage in that it is possible to use a wide zoom function as described later.

Figure 7:
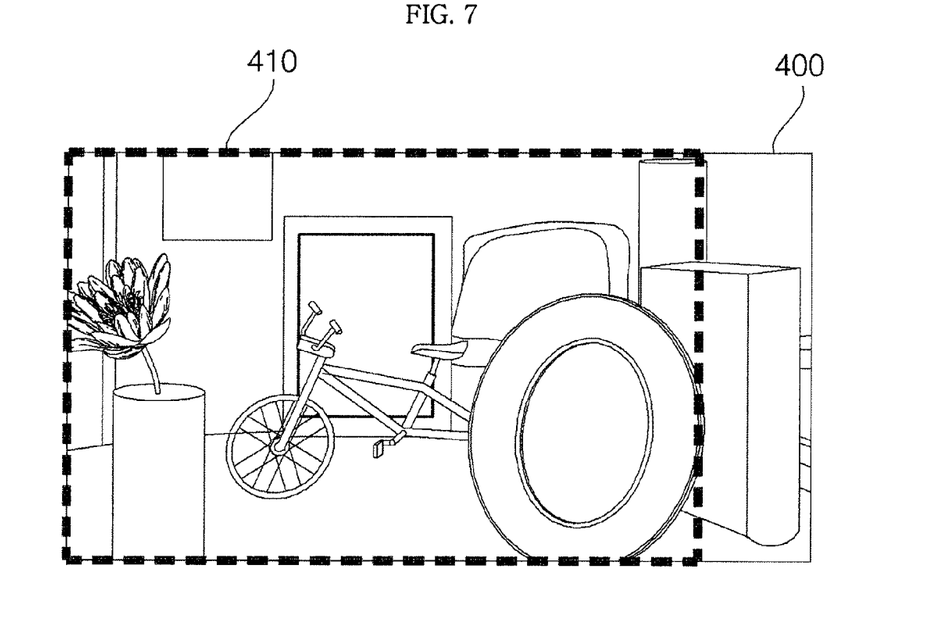
FIGS. 7 to 9 illustrate a method for generating a stereoscopic 3D image in a mobile terminal according to an embodiment of the present invention.
Figure 8:
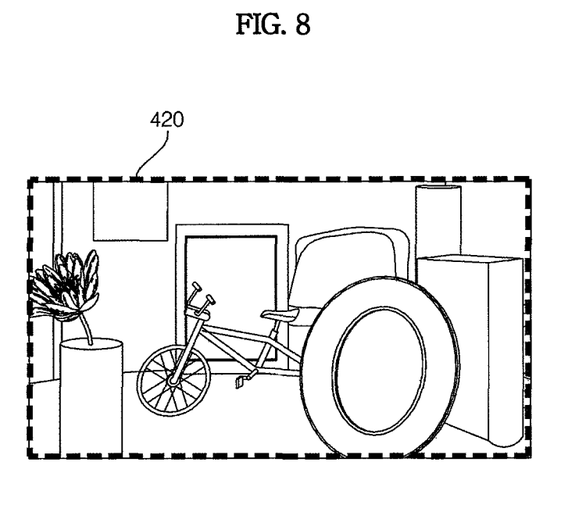
Figure 9:
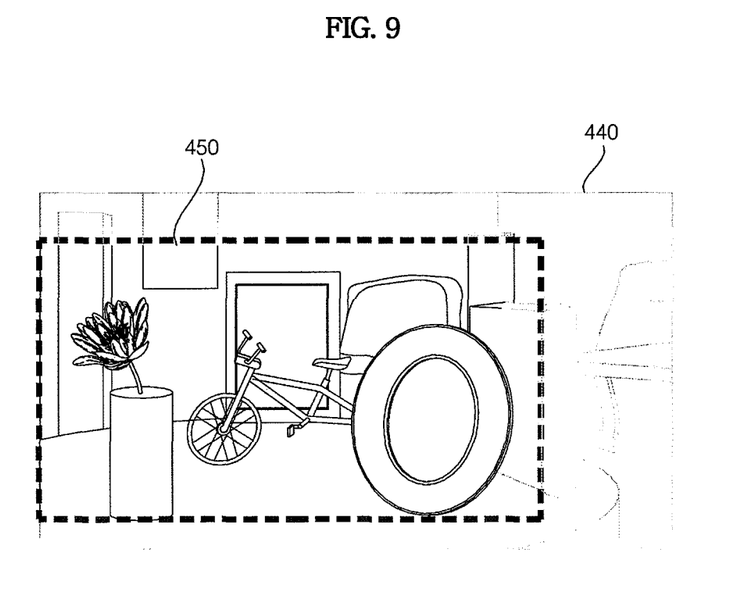

FIGS. 7 to 9 illustrate a method for generating a stereoscopic 3D image in a mobile terminal according to an embodiment of the present invention.

First, FIG. 7 illustrates the case where a stereoscopic 3D image is generated using two cameras including image sensors having the same number of pixels. In this case, the resolution of the stereoscopic 3D image 410 is reduced compared to the resolution of a 2D image 400 that can be captured using one camera.

FIG. 8 illustrates a stereoscopic 3D image 420 that can be generated when the second camera 121c uses an image sensor having a larger number of pixels and a wide angle lens. In this case, the resolution of the stereoscopic 3D image 420 is substantially the same as the resolution of a 2D image that can be captured using the first camera 121b.

FIG. 9 illustrates a 2D image 440 that can be captured using the second camera 121c and a stereoscopic 3D image 450 that can be generated using both the first and second cameras 121b and 121c. It is possible to generate a stereoscopic 3D image having the same resolution as that of a 2D image that can be captured using the first camera 121b when the second camera 121c uses an image sensor having a larger number of pixels than that of the first camera 121b and a wide angle lens as shown in FIG. 9.

When one of the first and second cameras 121b and 121c uses a wide angle lens, it is possible not only to generate a stereoscopic 3D image having the same resolution as that of a basic 2D image but also to provide a wide zoom function in addition to basic zoom functions.

Figure 10:
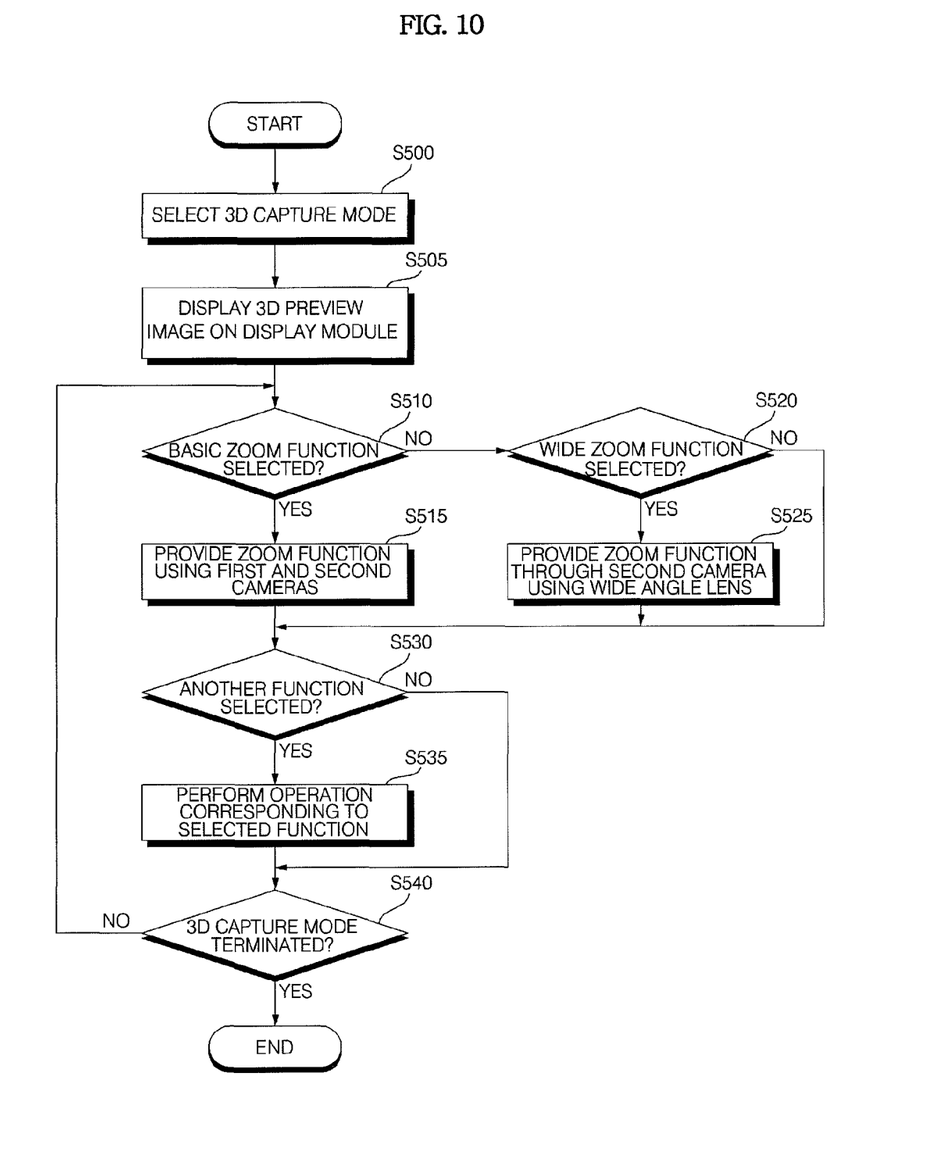
FIG. 10 is a flow chart illustrating a method for providing a wide zoom function in a mobile terminal according to an embodiment of the present invention.

FIG. 10 is a flow chart illustrating a method for providing a wide zoom function in a mobile terminal according to an embodiment of the present invention.

As shown in FIG. 10, when a 3D capture mode for generating stereoscopic 3D images is selected from a camera menu according to a user command (S500), the controller 180 combines images input through the first and second cameras 121b and 121c and displays a 3D preview image on the display module (S505).

When a basic zoom function is selected while the 3D preview image is being displayed (S510), the controller 180 provides the zoom function using the images input through the first and second cameras 121b and 121c (S515). That is, a zoomed-in or zoomed-out 3D preview image may be displayed when the basic zoom function is selected.

When the wide zoom function is selected while the 3D preview image is being displayed (S520), the controller 180 provides the zoom function through the second camera 121c using a wide angle lens (S525). That is, a zoomed-in or zoomed-out 3D preview image may be displayed using the wide angle lens when the wide zoom function is selected.

When another function such as another capture mode selection or capture mode switching is selected (S530), the controller 180 performs an operation corresponding to the selected function (S535).

The above procedure is repeated until the 3D capture mode is terminated (S540). Through the above procedure, it is possible to provide the wide zoom function using the wide angle lens that is used to generate a stereoscopic 3D image having the same resolution as that of a basic 2D image.

Figure 11:
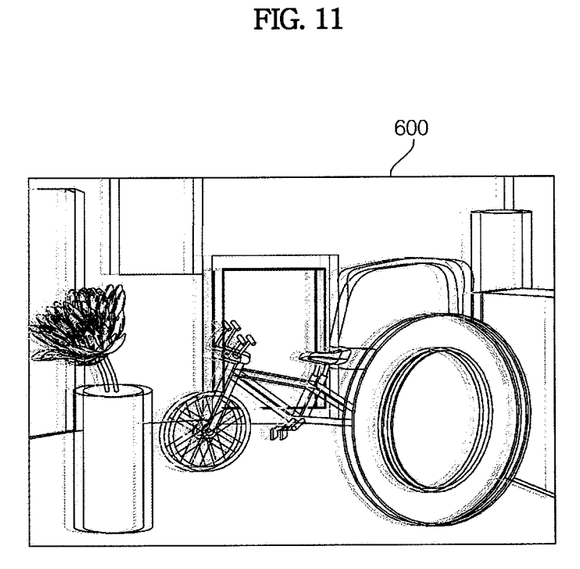
FIGS. 11 to 13 illustrate a method for providing a wide zoom function in a mobile terminal according to an embodiment of the present invention.
Figure 12:
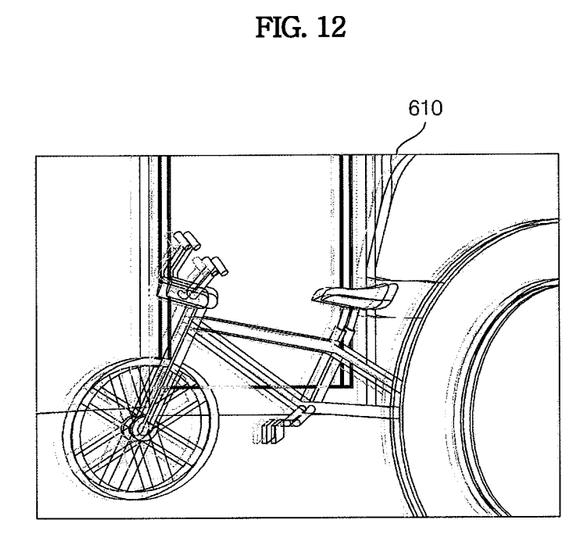
Figure 13:
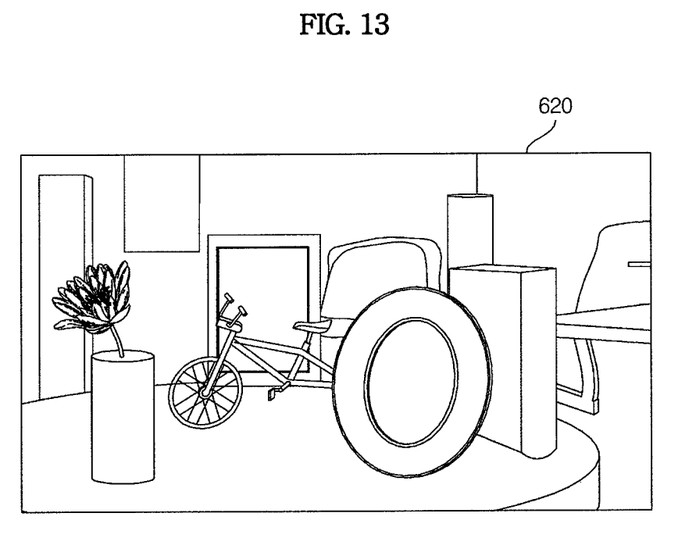

FIGS. 11 to 13 illustrate a method for providing a wide zoom function in a mobile terminal according to an embodiment of the present invention.

First, FIG. 11 illustrates an exemplary preview screen in a 3D capture mode. When the mobile terminal has entered the 3D capture mode, a 3D preview image screen 600 is displayed in a default size on the display module 151 as shown in FIG. 11.

When a zoom-in function is selected on the 3D preview image screen 600 having the default size, a zoomed-in 3D preview image screen 610 may be displayed as shown in FIG. 12. On the other hand, when a zoom-out function is selected on the 3D preview image screen 600 having the default size, a zoomed-out 2D preview image screen 620 may be displayed as shown in FIG. 13.

A zoomed-in or zoomed-out screen may be displayed as a 3D preview image only within a 3D capture range for which a stereoscopic 3D image can be generated using the first and second cameras 121b and 121c as described above. Thus, to display a preview image, the range of which exceeds the 3D capture range, it is possible to use a wide zoom function that can display a preview image in a wider range using the wide angle lens.

Such a wide zoom function can be used for a variety of uses together with the 3D capture function or other functions. In addition, one of the first and second cameras 121b and 121c may be selected and a 2D image may then be captured by activating only the selected camera.

As is apparent from the above description, the present invention has a variety of advantages. For example, it is possible to generate a stereoscopic 3D image having the same resolution as that of a 2D image, that can be captured, by using a wide angle lens or an image sensor having a larger number of pixels only for one of the two cameras used to generate stereoscopic 3D images. It is also possible to provide a wide zoom function together with a 3D zoom function through the camera that uses the wide angle lens.

The mobile terminal and the method for controlling the operation of the same according to the present invention are not limited in application to the configurations and methods of the embodiments described above and all or some of the embodiments may be selectively combined to implement various modifications.

The method for controlling a mobile terminal according to the present invention can be embodied as processor readable code stored in a processor readable medium provided in the mobile terminal. The processor readable medium includes any type of storage device that stores data that can be read by a processor. Examples of the processor readable medium include Read Only Memory (ROM), Random Access Memory (RAM), CD-ROMs, magnetic tapes, floppy disks, optical data storage devices, and so on. The processor readable medium can also be distributed over a network of coupled processor systems so that the processor readable code is stored and executed in a distributed fashion.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

What is claimed is:

1. A mobile terminal, comprising:
   a display module;
   a first camera including a first image sensor and a second camera including a second image sensor having a larger number of pixels than the first image sensor, the first and second cameras located on a same surface on a same side of the mobile terminal, and configured to generate a stereoscopic 3D image, the first and second cameras respectively including first and second lenses, the second lens having a wider angle than the first lens; and
   a controller configured to:
      generate the stereoscopic 3D image using a disparity between first and second images captured through the first and second cameras, respectively,
      control the display module to display the stereoscopic 3D image generated using the disparity between the captured first and second images respectively corresponding to the first and second cameras located on the same surface on the same side of the mobile terminal,
      receive a first selection to select between a basic zoom function and a wide zoom function,
      if the wide zoom function is selected, receive a second selection to select between a zoomed-in mode and a zoomed-out mode,
      zoom in or zoom out the displayed stereoscopic 3D image according to the zoomed-in mode or the zoomed-out mode, respectively, using the second camera having the wider angle lens than the first lens, and
      control the display module to display the zoomed-in or zoomed-out stereoscopic 3D image,
   wherein the zoomed-in or zoomed-out stereoscopic 3D image is displayed on a 3D preview image screen in the display module, and
   wherein one of the first and second cameras is movable in a horizontal direction to adjust an interval between the first and second cameras.

2. The mobile terminal according to claim 1, further comprising:
   a memory operatively connected to the controller and configured to store data corresponding to the stereoscopic 3D image.

3. The mobile terminal according to claim 1, wherein the controller is configured to generate the stereoscopic 3D image using a common region of the images captured through the first and second cameras.

4. A mobile terminal, comprising:
   a display module;
   first and second cameras located on a same surface on a same side of the mobile terminal, and configured to generate a stereoscopic 3D image, the first and second cameras respectively including first and second lenses, the second lens having a wider angle than the first lens;
   a first image sensor having a first number of pixels;
   a second image sensor having a second number of pixels, larger in number than the first number of pixels; and
   a controller configured to:
      generate the stereoscopic 3D image using a disparity between first and second images captured through the first and second cameras, respectively,
      control the display module to display the stereoscopic 3D image generated using the disparity between the captured first and second images,
      receive a first selection to select between a basic zoom function and a wide zoom function,
      if the wide zoom function is selected, receive a second selection to select between a zoomed-in mode and a zoomed-out mode,
      zoom in or zoom out the displayed stereoscopic 3D image according to the zoomed-in mode or the zoomed-out mode, respectively, using the second camera having the wider angle lens than the first lens, and
      control the display module to display the zoomed-in or zoomed-out stereoscopic 3D image,
   wherein the zoomed-in or zoomed-out stereoscopic 3D image is displayed on a 3D preview image screen in the display module, and
   wherein one of the first and second cameras is movable in a horizontal direction to adjust an interval between the first and second cameras.

5. A method for controlling operation of a mobile terminal including a first camera including a first image sensor and a second camera including a second image sensor having a larger number of pixels than the first image sensor, first and second cameras located on a same surface on a same side of the mobile terminal, and configured to generate a stereoscopic 3D image, the first and second cameras respectively including first and second lenses, the second lens having a wider angle than the first lens, the method comprising:
   capturing first and second images through the first and second cameras, respectively;
   generating the stereoscopic 3D image using a disparity between the first and second images captured through the first and second cameras, respectively;

displaying, via a display module, the stereoscopic 3D image generated using the disparity between the captured first and second images;
receiving a first selection to select between a basic zoom function and a wide zoom function;
if the wide zoom function is selected, receiving a second selection to select between a zoomed-in mode and a zoomed-out mode;
zooming in or zooming out the displayed stereoscopic 3D image according to the zoomed-in mode or the zoomed-out mode, respectively, using the second camera having the wider angle lens than the first lens; and
displaying, via the display module, the zoomed-in or zoomed-out stereoscopic 3D image,
wherein the zoomed-in or zoomed-out stereoscopic 3D image is displayed on a 3D preview image screen in the display module, and
wherein one of the first and second cameras is movable in a horizontal direction to adjust an interval between the first and second cameras.

6. The method according to claim 5, further comprising:
adjusting a resolution of the stereoscopic 3D image by adjusting an interval between the first camera and the second camera.

7. The method according to claim 5, further comprising:
selecting one of the first and second cameras in response to a selection command; and
capturing a 2D image using the selected camera.

8. A method for controlling operation of a mobile terminal including first and second cameras located on a same surface on a same side of the mobile terminal, and configured to generate a stereoscopic 3D image, the first and second cameras respectively including first and second lenses, the second lens having a wider angle than the first lens, the second camera including a second image sensor having a second number of pixels, larger in number than a first number of pixels of a first image sensor included in the first camera, the method comprising:
capturing first and second images through the first and second cameras, respectively;
generating the stereoscopic 3D image using a disparity between the first and second images captured through the first and second cameras, respectively;
displaying, via a display module, the stereoscopic 3D image generated using the disparity between the captured first and second images;
receiving a first selection to select between a basic zoom function and a wide zoom function;
if the wide zoom function is selected, receiving a second selection to select between a zoomed-in mode and a zoomed-out mode;
zooming in or zooming out the displayed stereoscopic 3D image according to the zoomed-in mode or the zoomed-out mode, respectively, using the second camera having the wider angle lens than the first lens; and
displaying, via the display module, the zoomed-in or zoomed-out stereoscopic 3D image,
wherein the zoomed-in or zoomed-out stereoscopic 3D image is displayed on a 3D preview image screen in the display module, and
wherein one of the first and second cameras is movable in a horizontal direction to adjust an interval between the first and second cameras.

9. A method for controlling operation of a mobile terminal including a first camera including a first image sensor and a second camera including a second image sensor having a larger number of pixels than the first image sensor, first and second cameras located on a same surface on a same side of the mobile terminal, and configured to generate a stereoscopic 3D image, the first and second cameras respectively including first and second lenses, the second lens having a wider angle than the first lens, the method comprising:
capturing first and second images through the first and second cameras, respectively;
displaying, via a display module, the stereoscopic 3D image generated using a disparity between the captured first and second images;
generating the displayed stereoscopic 3D image using the disparity between the preview image of the first camera and the preview image of the second camera;
receiving a command to perform a wide zoom function of the displayed stereoscopic 3D image using the disparity between the captured first and second images;
if the command to perform the wide zoom function is received, receiving a second selection to select between a zoomed-in mode and a zoomed-out mode,
zooming in or zooming out the displayed stereoscopic 3D image according to the zoomed-in mode or the zoomed-out mode, respectively, using the second camera having the wider angle lens than the first lens in response to the command to perform the wide zoom function; and
displaying, via the display module, the zoomed stereoscopic 3D image,
wherein the zoomed-in or zoomed-out stereoscopic 3D image is displayed on a 3D preview image screen in the display module, and
wherein one of the first and second cameras is movable in a horizontal direction to adjust an interval between the first and second cameras.

10. The method according to claim 9, further comprising:
selecting one of the first and second cameras in response to a selection command; and
capturing a 2D image using the selected camera.

* * * * *